(12) United States Patent
Rabinovich

(10) Patent No.: US 8,334,475 B2
(45) Date of Patent: Dec. 18, 2012

(54) PROCESS FOR ENERGY BEAM SOLID-STATE METALLURGICAL BONDING OF WIRES HAVING TWO OR MORE FLAT SURFACES

(76) Inventor: Joshua E. Rabinovich, Newton, MA (US)

( * ) Notice: Subject to any disclaimer, the term of this patent is extended or adjusted under 35 U.S.C. 154(b) by 681 days.

(21) Appl. No.: 12/590,249

(22) Filed: Nov. 4, 2009

(65) Prior Publication Data

US 2010/0155374 A1    Jun. 24, 2010

Related U.S. Application Data

(60) Provisional application No. 61/198,203, filed on Nov. 4, 2008.

(51) Int. Cl.
  B23K 15/00    (2006.01)
  B23K 26/20    (2006.01)
(52) U.S. Cl. ............ 219/121.11; 219/121.12; 219/121.6
(58) Field of Classification Search ............ 219/121.12, 219/121.15, 121.14, 121.13, 121.6, 121.63, 219/121.64
  See application file for complete search history.

(56) References Cited

U.S. PATENT DOCUMENTS

| | | | |
|---|---|---|---|
| 1,533,300 A | 4/1925 | Baker | 219/76.14 |
| 3,156,968 A | 11/1964 | White, Jr. | 219/76.14 |
| 3,397,440 A | 8/1968 | Dalin | |
| 3,558,846 A | 1/1971 | Ujie | 219/78.14 |
| 3,737,616 A | 6/1973 | Ujie | 219/73.11 |
| 3,821,840 A | 7/1974 | Kershaw | 219/78.14 |
| 3,952,180 A * | 4/1976 | Gnanamuthu | 219/121.65 |
| 3,974,016 A | 8/1976 | Bondybey et al. | 156/272.8 |
| RE29,815 E * | 10/1978 | Gnanamuthu | 219/121.64 |
| 4,122,240 A * | 10/1978 | Banas et al. | 428/655 |
| T988007 I4 | 11/1979 | Drew et al. | |
| 4,323,756 A | 4/1982 | Brown et al. | 219/121.63 |
| 4,575,330 A | 3/1986 | Hull | |
| 4,684,781 A | 8/1987 | Frish et al. | |
| 4,743,733 A | 5/1988 | Mehta et al. | 219/121.66 |
| 4,752,455 A | 6/1988 | Mayer | |
| 4,803,334 A | 2/1989 | Burke et al. | 219/121.64 |
| 4,826,736 A | 5/1989 | Nakamura et al. | 148/525 X |
| 4,841,617 A | 6/1989 | Schmidt et al. | 219/121.84 X |
| 4,857,693 A | 8/1989 | Rump | 219/76.14 |
| 4,863,538 A | 9/1989 | Deckard | 219/121.63 |
| 4,931,125 A | 6/1990 | Volkmann et al. | 219/121.64 X |
| 4,947,463 A | 8/1990 | Matsuda et al. | 219/121.84 |
| 5,038,014 A | 8/1991 | Pratt et al. | 219/121.64 |
| 5,134,569 A | 7/1992 | Masters | 156/272.8 |
| 5,147,587 A | 9/1992 | Marcus et al. | 264/22 |
| 5,208,431 A | 5/1993 | Uchiyama et al. | 219/121.84 |

(Continued)

FOREIGN PATENT DOCUMENTS

CA      678500      1/1964

(Continued)

Primary Examiner — Long Tran
Assistant Examiner — Jordan Klein
(74) Attorney, Agent, or Firm — James Creighton Wray

(57) ABSTRACT

An energy beam assisted solid-state welding welds a wire material to a substrate. A wire of coating or repairing material is placed in contact with a surface or surfaces of a substrate. A beam is directed into an outer flat surface of the wire, which heats the wire through flat outer surface of the wire with beam energy. Beam energy produces compression stress-waves that drive molecules of the material flat wire into a surface of the substrate, joining the material and the substrate with strong wave shaped interfaces.

13 Claims, 1 Drawing Sheet

U.S. PATENT DOCUMENTS

| | | | | |
|---|---|---|---|---|
| 5,233,150 | A | 8/1993 | Schneebeli et al. | 219/76.14 |
| 5,266,139 | A | 11/1993 | Yokota et al. | 156/180 |
| 5,283,415 | A * | 2/1994 | Nishi et al. | 219/121.64 |
| 5,303,141 | A | 4/1994 | Batchelder et al. | 364/468 |
| 5,312,584 | A | 5/1994 | Frasier et al. | 419/47 |
| 5,405,660 | A | 4/1995 | Psiuk et al. | 427/597 |
| 5,578,227 | A * | 11/1996 | Rabinovich | 219/121.63 |
| 5,738,817 | A | 4/1998 | Danforth et al. | 264/603 |
| 5,846,057 | A * | 12/1998 | Ferrigno et al. | 416/241 R |
| 5,900,170 | A | 5/1999 | Marcin, Jr. et al. | 219/121.66 |
| 6,144,008 | A * | 11/2000 | Rabinovich | 219/121.64 |
| 6,155,789 | A * | 12/2000 | Mannava et al. | 416/241 R |
| 6,165,406 | A | 12/2000 | Jang et al. | 264/308 |
| 6,200,689 | B1 * | 3/2001 | Ferrigno et al. | 428/600 |
| 6,269,540 | B1 | 8/2001 | Islam et al. | 29/889.7 |
| 6,441,338 | B1 * | 8/2002 | Rabinovich | 219/121.64 |
| 6,459,069 | B1 * | 10/2002 | Rabinovich | 219/121.63 |
| 6,811,744 | B2 | 11/2004 | Keicher et al. | 419/5 |
| 6,899,777 | B2 | 5/2005 | Vaidyanathan et al. | 156/89.11 |
| 6,989,507 | B2 * | 1/2006 | Clark | 219/121.64 |
| 7,020,539 | B1 | 3/2006 | Kovacevic et al. | 700/166 |
| 7,022,938 | B2 * | 4/2006 | Tamura et al. | 219/121.64 |
| 7,211,763 | B2 * | 5/2007 | Zhang | 219/121.73 |
| 7,600,666 | B2 * | 10/2009 | Rabinovich | 228/125 |

FOREIGN PATENT DOCUMENTS

| | | |
|---|---|---|
| DE | 3905684 | 8/1990 |
| EP | 0529816 | 3/1993 |
| FR | 2583333 | 12/1986 |
| JP | 63-33187 | 2/1988 |
| JP | 299286 | 4/1990 |
| JP | 04288974 | 10/1992 |
| WO | WO8806564 | 9/1998 |

* cited by examiner

PROCESS FOR ENERGY BEAM SOLID-STATE METALLURGICAL BONDING OF WIRES HAVING TWO OR MORE FLAT SURFACES

This application claims the benefit of U.S. Provisional Application No. 61/198,203, filed Nov. 4, 2008, which is hereby incorporated by reference in its entirety.

BACKGROUND OF THE INVENTION

The present invention generally relates to the field of materials deposition for a component fabrication, restoration, and surface improvement and more particularly, is directed to a process and apparatus for coating or cladding a layer or layers of metal and non-metal materials onto substrates of dissimilar materials.

There are variety of methods known in the prior art for coating or cladding a layer of dissimilar material onto a substrate. Some examples of the known methods that produce enhanced bonding between the coating and the substrate as follows:
1. Thermal Spray processes,
2. Conventional Arc Welding,
3. Laser and Electron Beam metal deposition,
4. Large Scale Explosion Welding and Micro-explosion Welding.

The terms "coating" and "cladding" although sometimes used interchangeably, usually refer to different application processes. Cladding refers to a coating layer production process by bonding a plate or film to a substrate, while coating refers to a coating layer production process by bonding of materials in the form other than a plate or a film for example, liquids, powders or wires.

Thermal Spray Coating processes such as plasma spray or high-velocity oxy-fuel (HVOF) methods produce a relatively weak mechanical bond with a substrate and work well in applications where a component is subjected primarily to compression loads. In more demanding applications where a component is subjected to torsion, shear, or bending stresses, the coating needs to have a strong metallurgical bond with a substrate.

Metallurgical bond strength welding can be produced with such welding methods as arc welding, plasma, laser powder deposition, and Electron Beam wire or powder deposition. However, these welding methods apply an excessive heat and a melt-pool at the substrate for a time sufficient to result in melting and intermixing of elements of the alloys being joined. Such liquid phase intermixing and associated chemical reactions have been observed to result in the creation of brittle intermetallic compounds at the joint interface leading to coating cracking and flaking.

If the coating and substrate are metallurgically compatible or "weldable", then conventional welding techniques may be used. This process is sometimes referred to as fusion welding or hardfacing. Fusion hardfacing cannot be used in cases where the substrate cannot be heated to the liquefaction state or the materials are not weldable. For example, coating of aluminum with high temperature and strength metals, such as titanium and nickel alloys, can often be bonded by an explosion welding process. Explosion welding belongs to a solid-state welding methods allowing for a strong metallurgical bond between materials of dissimilar physical characteristics and without substantial liquefaction of the substrate.

The explosion welding method is based on high velocity oblique collision of two metal plates. The cladding plate (the "flyer") is covered with an explosive material and placed at some distance from the substrate. The explosive material is detonated and it propagates though the entire surface of the flyer plate. The flyer plate collides with the substrate at velocities in the range of 400-3000 m/sec. The high collision pressure and heat created at the collision line allows hydrodynamic flow to occur creating a strong wavy interface between dissimilar metals. The shortcoming of this process is in its high cost and its safety issues due to handling and controlling explosives. Another limitation of the process is that it is primarily suitable for cladding of flat surfaces.

Other methods similar to explosion welding are using laser energy to evaporate the top layer of a foil or a separate sacrificial layer to realize the recoil forces, generated by the high velocity of evaporated gases, to drive the coating foils toward the target substrate.

Drew et al T988007 (1979) discloses a laser vapor deposition technique wherein a CW laser beam is directed through a transparent substrate onto a reservoir of metal on the opposite side of and spaced from the substrate. The laser beam heats and vaporizes the metal of the reservoir, which is then redeposited on the opposing surface of the substrate.

Mayer et al, "Pulsed Laser Microfabrication" U.S. Pat. No. 4,752,455, proposes a system and method of pulsed-laser microfabrication wherein a first substrate of transparent material, such as glass, has a conductive film and then a target material both positioned on a surface of the transparent substrate. The target material is placed immediately adjacent to the target substrate surface. Pulsed laser energy is directed through the transparent substrate onto the conductive film at a sufficient intensity and for a sufficient duration to rapidly vaporize the metal film. The target materials are driven by film vaporization energy and by the reaction thereof against the glass substrate onto the opposing or object surface of a second substrate.

This process resembles the large scale explosion welding but on a micro-level, often referred to as a micro-explosion welding, and is limited to cladding of very thin films and primarily on flat surfaces.

Frish et al, "Method for Bonding Using Laser Induced Heat and Pressure" U.S. Pat. No. 4,684,781, proposes bonding metal foils to substrates of dissimilar metal by placing the foil in contact with the substrate and then irradiating the foil surface remote from the substrate with a laser pulse so as to ablate a portion of the foil surface.

According to the invention, a foil layer of a material to be applied as a coating to a substrate is laid over and in contact with the substrate surface which is to be coated. A laser beam, typically pulsed, and of a very high instantaneous intensity is applied to the exposed foil layer.

The intensity of the radiation as focused onto the foil at a small spot is extremely high, substantially greater than that used in prior applications such as laser welding. The extremely high laser intensity produces an instantaneous vaporization of a small portion of the foil surface. The reaction to the vapor pressure or "recoil force" generated by the foil surface vaporization is a pressure or shock wave transmitted in the opposite direction and through the thin foil layer in the direction of the interface between the foil and substrate. Laser power densities, typically usable in the above invention, range from hundreds of megawatts per square centimeter to hundreds of thousands of megawatts per square centimeter with pulse durations measured in a few hundredths of a microsecond up to over twenty microseconds.

Thermal and pressure waves are generated in the foil and travel through the foil thickness at differing velocities. If the thermal wave reaches the foil/substrate interface during irradiation, both materials will melt and thereafter mix under the influence of the laser-induced pressure gradients. Thus, the disclosed "laser stamping" technique makes use of both heat and pressure supplied to the foil by the high intensity laser pulse.

The major shortcomings of this method are as follows:
1. The foil is pre-placed onto a substrate with sufficiently large gaps present between the foil and the substrate due to the initial imperfection in flatness of a foil and the substrate as well as the additional irregular gaps created during the laser-irradiation of the foil. These gaps prevent the pressure and thermal waves from reaching the substrate and thus prevent the production of a reliable uniform bond of the foil to the substrate.
2. Because of the above irregular gaps between the pre-placed foil and the substrate, an extremely high power densities and very thin foils (2 to 100 micrometers) are required in order to create sufficient momentum to propel the foil toward the substrate against the gap resistance.
3. In addition, these extremely high power intensities of the laser beam delivered to a very thin foil, having a plurality of gaps of different distances, would tend to perforate the foil in many places where there is a gap between a foil and the substrate, producing unacceptable quality coatings.

Rabinovich "Rapid Prototyping System" U.S. Pat. No. 5,578,227, which is fully incorporated herein by reference, describes a part making method and apparatus with laser assisted fusion of a rectangular wire to a substrate. In this method the feedstock fusion is performed with a laser beam of the size and power density sufficient for reliable spot or continuous fusion welding of the feedstock to the previous layer while keeping the feedstock cross-section in substantially original shape and producing fusion with a limited local heat input into the part. This limited heat input is achieved through the wire surface-to-surface contact with the substrate, which provides good thermal conductivity to heat flow. This effective heat conduction eliminates the need in the creation of a molten-pool in the substrate prior to metal deposition, as it is the case in other energy beam metal deposition processes, which utilize metal powders or round wires. Although the advantages of this melt-pool free, ultra-low heat input process have been instrumental for repairs of many complex and thin wall structures and many dissimilar materials, the true solid-state welding capabilities required for strong metallurgical bonding of many dissimilar materials was not anticipated at that time.

While practicing the method of U.S. Pat. No. 5,578,227, under a trademark of Precision Metal Deposition (PMD™), the author discovered new and unexpected qualities of this method, which with a number of improvements, allow bonding of extremely dissimilar metals to be performed in a solid-state mode of welding.

SUMMARY OF THE INVENTION

In accordance with the teaching of the present invention, a process is disclosed for energy beam assisted solid-state metallurgical bonding of a wire with two or more flat surfaces, to a substrate, for the purpose of substrate coating, 3-Dimensional component buildup, restoration, and component surface improvement. It is thus possible, by controlling energy beam produced temperature gradient through the wire and a suddenly applied energy induced compression stress-wave effects, to join, in a solid-state welding mode, metals with extremely dissimilar physical characteristics, which could not be joined by conventional welding methods.

The disclosed process allows for a solid-state welding on flat and curved surfaces with extremely strong wave-shape interface morphology, reminiscent to the explosion welding but without its high cost, component shape limitations, and safety disadvantages. The process allows for strong, metallurgical bond coating of components made out of inexpensive, light weight metals, such as aluminum alloy, with high strength alloys thus transforming these components into stronger metal-composite components without loosing their light weight value.

Yet another revolutionary capability of the disclosed process is in restoration of high value aircraft jet engine components, such as turbine blades, made out of single crystal alloys. Single crystal alloys cannot tolerate repairs with temperatures reaching liquefaction levels; they re-crystallize and loose their single crystal structure and fatigue strength qualities. The disclosed process can restore these extremely expensive components by keeping the temperatures of the parent material below the material's liquefaction point, thus maintaining the single crystal advantages.

In practicing this invention, a continuously fed flat wire is delivered to a substrate such that the bottom of the wire flat surface(s) is tangential to the substrate such that the contact of the wire with the substrate constitutes substantially a surface(s), allowing efficient conduction of the energy beam produced stress and thermal waves from the wire to the substrate. The flat wire surface conforms to the surface of the substrate and provides repeatable and reliable contact during coating process.

An energy beam, (for example Laser or Electron Beam), preferably pulsed, is simultaneously applied to the wire, with a magnitude controlled to be sufficient to produce a sudden compressive stress shock wave at the surface of the wire and a thermal wave from the energy beam. The thermal wave establishes a temperature gradient through the wire thickness and, together with the compressive stress shock wave, propagates through the wire and the top surface of the substrate.

The desired temperature gradient is established through the wire and the top surface of the substrate by controlling the energy beam-spot energy, power density and pulse period. The temperature gradient through the wire is controlled such that while the part of the top surface of the flat wire is liquefied, the surface adjacent to the substrate can be maintained in a solid or semisolid state at the temperatures below of the temperature of liquefaction of the substrate material.

With the simultaneous action of the compression wave generated by the laser beam at the top surface of the wire, some particles of the wire are moving with the compression wave, and penetrating through their common surface of contact into the substrate cause hydrodynamic wavy interface of the materials of wire and the substrate. The wire contact surface and the substrate top layer are maintained at the temperatures below the substrate's liquefaction temperature, thus producing a strong metallurgical bond between the coating and substrate in a solid-state mode.

These and further and other objects and features of the invention are apparent in the disclosure, which includes the above and ongoing written specification, with the drawings.

DETAILED DESCRIPTION OF PREFERRED EMBODIMENT

Figure 1:
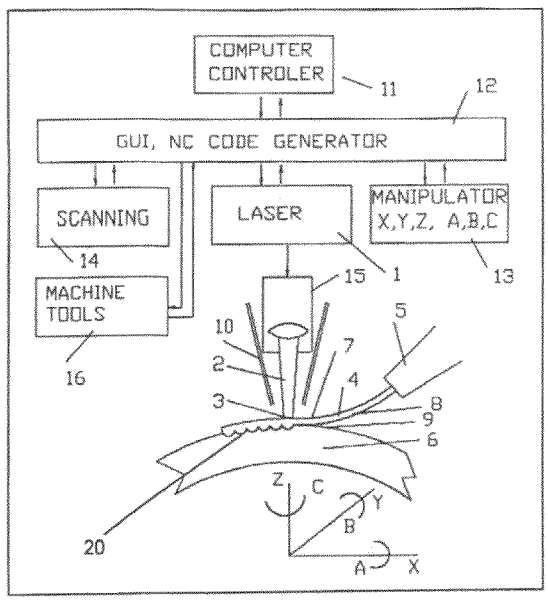
FIG. 1 is a system block diagram of functional modules, software and controls of the apparatus and a detail of the interface of the flat wire with a substrate in a solid-state mode coating.

The present invention disclosed a process for energy beam assisted solid-state metallurgical bonding of a wire with two or more flat surfaces, to a substrate, for the purpose of substrate coating, 3-Dimensional component buildup, restoration, and component surface improvement. An energy beam, (for example Laser or Electron Beam), preferably pulsed, is used. For the purpose of this description, a laser 1 is used and its focused beam 2 as shown in the block diagram of FIG. 1. The laser beam focused spot 3 of an adjustable small diameter is directed to the top surface 7 of the wire 4.

A continuously fed flat wire 4 is dispensed from a wire nozzle 5 and delivered to a substrate 6 such that the bottom of the wire flat surface(s) is tangential to the substrate 6 top surface 9. The contact of the wire with the substrate constitutes substantially a surface(s), thus allowing efficient conduction of the laser beam produced stress and thermal waves from the wire to the substrate. The flat wire surface conforms to the surface of the substrate and provides repeatable and reliable contact during coating process.

The laser beam 2 is simultaneously applied to the wire, with a magnitude controlled by the GUI Module 12, to be sufficient to produce a sudden compressive stress shock wave at the surface of the wire and a thermal wave from the applied laser energy. The thermal wave establishes a temperature gradient through the wire thickness and, together with the compressive stress shock wave, propagates through the wire 4 and the top surface 9 of the substrate 6.

The desired temperature gradient is established through the wire 4 and the top surface of the substrate 6 by controlling the laser beam-spot 3 energy and power densities as well as the pulse period. The temperature gradient is controlled such that while the part of the top surface 7 of the flat wire 4 is liquefied, the wire surface 8, adjacent to the substrate 6, can be maintained in a solid or semisolid state at the temperatures below of the temperature of liquefaction of the substrate material. The laser power, energy and the pulse duration are controlled by the system's computer 11, and a controller and its Graphic User Interface module 12. The system's controller has a two-way communication with all the modules of the system including the laser system 1 to obtain the desired laser parameters.

With the simultaneous action of the compression wave generated by the laser beam at the top surface 7 of the wire, some particles of the wire are moving with the compression wave, and penetrating through their common surface of contact into the substrate causing hydrodynamically produced wavy interface 20 of the materials of wire and the substrate. See FIGS. 1, 2, 3, 4 and 5. The wire contact surface 8 and the substrate top layer 9 are maintained at the temperatures below the substrate's liquefaction temperature, thus producing a strong metallurgical bond between the coating and substrate in a solid-state welding mode. The calculations estimating the amount of material penetration waves 20 into the substrate are presented in the Appendix of this application.

Figure 5:
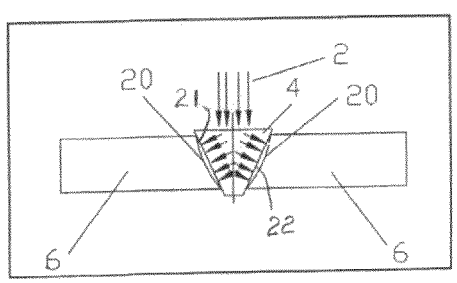
FIG. 5 is a diagram showing a solid-state bonding of two adjacent components, or repairing a crack in the same component, with a wire having a wedge form with multiple flat surfaces.

FIG. 5 demonstrates the applicability of this invention for connecting two components, or repairing a crack in a single component by means of a wire with multiple flat surfaces. The sides 21 of the components or crack are pre-machined such that the sides 21 or connecting surfaces have the same angles as the sides 22 of the wedged wire 4. The momentum of particles moving with the stress-wave propagation is distributed along the sides 22 of the wedge-shape wire 4 cross-section, thus producing a similar wave shape protrusions 20 of wire material into the substrate material in a solid-state mode of welding with the same mechanism as described above.

Energy beam power and energy densities used in the present invention, are commensurate with the wire and substrate materials, wire thickness, and the desired amount of wave-shape morphology at the wire-substrate interface, for example, for a titanium Ti-64 alloy wire with thickness of ~0.020 (0.5 mm) deposition onto an aluminum AL-6061 alloy substrate in a solid-state welding mode, the laser beam power density used was only 0.0785 megawatts per square centimeter with a pulse time duration of approximately 10 milliseconds.

The bonding of the flat wire coating to the substrate is conducted in an inert gas atmosphere, such as Argon gas, delivered with a gas flow nozzle 10.

A wire delivery means, with the wire dispensing nozzle 5, is continuously delivering the wire onto the substrate 6 such that the contact of the wire with the substrate constitute substantially a surface(s) to provide a good coupling of wire and substrate for an effective transportation of thermal-wave and the shock-wave carrying the wire particles into the substrate. With the present YAG laser of 300-Watts average power, the wires of 100 microns (0.004") to 500 microns (0.020") thick have been successfully bonded at the linear velocities of 12 in/min (300 mm/min). Scaling up the sizes and the deposition speeds can be achieved by utilizing higher average power energy-source.

An opto-mechanical module 15, FIG. 1, is provided for adjusting the laser beam spot suitable to the wire 4 width or to the desired fraction of the wire width. In addition, a means for scanning a laser beam across the wire width is provided in module 15 for the purposes of wire deposition and cutting FIG. 4.

Figure 2:
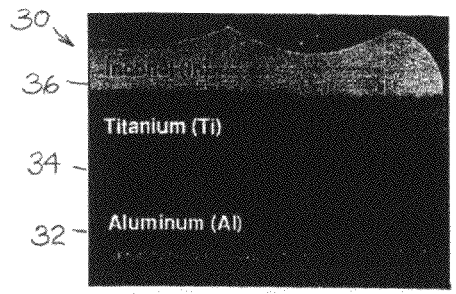
FIG. 2 is an Electron Scan Microscope image of a coating of aluminum with titanium and nickel alloys produced with the present invention in a solid-state welding mode and the typical wave-shape interface.
Figure 3:
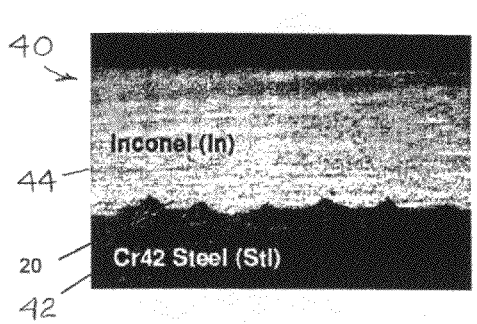
FIG. 3 is a photomicrograph of Inconel alloy coating of high carbon steel alloy produced with the present invention in a solid-state welding mode and the typical wave-shape interface.
Figure 4:
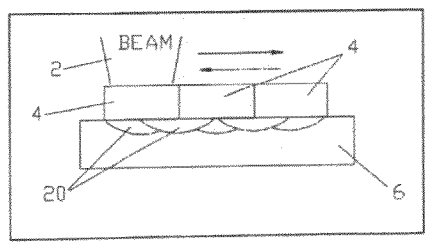
FIG. 4 is a diagram showing a coating in a solid-state welding mode of a surface with a rectangular wire

Thus, for example, a bonding of the flat titanium wire to an aluminum substrate was achieved in a solid-state mode, i.e. with the aluminum substrate being in a solid-state. FIG. 2 is an Electron Scanning Microscope (ESM) image 30 of thus produced coatings 34, 36 of aluminum 6061 substrate 32 with titanium Ti-64 alloy 34 and with a subsequent coating 36 of titanium layer 34 with nickel-based superalloy Inconel-718.

Other modules used in the present invention include but not limited to a surface scanning and reverse engineering module 14, Graphic User Interface (GUI) and Numerical Control Code Generating Module 12, Milling and Grinding Finish Machining Module 16, Part Manipulation Module 13 are employed to facilitate part scanning and reverse engineering, automated linear and rotary motion control of the component as well as the wire delivery and optical modules, in 3-Dimensional space. The component motion and the wire delivery modules are manipulated in X, Y, Z linear axis and A, B, and C rotation axis about these linear axis, respectively. The Part Manipulation Module 13 allows for a flat or 3-Dimensional component manipulation in 3-Dimensional space pivoted about the point, which belongs to the normal to the component's surface at the meeting point of the laser beam spot 3 and the wire 4 with the component's surface 9.

While the invention has been described with reference to specific embodiments, modifications and variations of the invention may be constructions without departing from the scope of the invention.

APPENDIX

The disclosed process exploits a compression stress-wave generated in the top "skin-deep" surface of the wire due to a very fast material expansion in a limited volume and in the initial near zero time of the energy pulse. The maximum value of this stress can be determined from the equation:

$$So = \alpha * \Delta T * E; \quad [1]$$

Where:
$\alpha$—coefficient of thermal expansion for the wire material
$\Delta T$—Temperature change during this initial time (from room temperature to the temperature of liquefaction)
$E$—Modulus of Elasticity of the material It can be seen, for example, that for a metal such as nickel alloy with $E=30 \times 10^6$ psi, with its liquefaction temperature around 2460° F. and the coefficient of thermal expansion of $7.1 \times 10^{-6}$ in/in×'F, the stress generated in the top thin layer of the wire at the initial near zero time of the energy pulse is: $So=511,200$ psi.

This stress, suddenly applied to the surface of the wire initially compresses the layer adjacent to it and then transferred to the next layer, and so on. Thus, the energy beam of area A applied to the top surface of the wire produces a compression zone and a compression stress-wave propagating through the wire thickness and into the substrate with velocity C. After time t, the compressed thickness of wire is equal to $L=Ct$.

The deformation $\delta$ of the compressed zone is:

$$\delta = So \times C \times t / E \quad [2]$$

The velocity V of the particles in the compressed zone is:

$$V = \delta/t = So \times C/E \text{ or } C = V \times E/So \quad [3]$$

The mass of particles moving in the wave is equal to $\rho \times A \times C \times t$, where A is the cross-section of the area under the energy beam. The force on the surface of the wire is $So \times A$. Momentum and impulse equation states that the mass times velocity is equal to force times time. Hence $$\rho \times A \times C \times t \times V = So \times A \times t \text{ or } So = C \times \rho \times V \text{ and } So = V \times \text{SQRT} (E \times \rho) \quad [4]$$

The force required to compress the unit length is $K=AE/L$, where L is the wire thickness;

The impact force delivered by the particles moving with the pressure stress-wave at the particles velocity V is:

$$F = So \times A = V \text{ SQRT}(K \times W/g) \quad [5]$$

Where W is the weight of compressed zone with moving particles and g is a gravitational constant;

Combining equations [3] and [4] gives the compression stress-wave front propagation velocity $C=\text{SQRT}(E/\rho)$ Substitution of parameters for nickel alloy wire, gives $C=200,280$ in/sec or 3.2 miles/sec; and the particle front wave velocity V is calculated to be 3,447 in/sec and the impact force imparted by the particles moving with the stress-wave is $F=1004$ lbf;

The stress-wave propagation through the wire thickness and the top layer of the substrate, both being under high temperature gradients and changing Young's Modulus, is a complex, transient process. Nevertheless, the above mathematical model of the process gives sufficiently good approximation and prediction of the acting thermal and mechanical forces involved. For example, the deformation of the pre-selected stress-wave travel length of 0.026 inches, the deformation of $\delta=0.0028$ inches is predicted. This is considering the material of substrate is carbon steel and it reaches the temperature of 2100° F. at the wire/substrate interface, (below its liquefaction temperature) and having its Modulus of Elasticity at that temperature of about $4 \times 10^6$ psi. Thus predicted deformation of $\delta=0.0028$ inches is an approximate amount of penetration (forged-in wave-shape interface) of the wire material particles into the substrate material. The values thus determined correlate closely with the test data derived from the micrographs 30 and 40. See FIG. 3, where an Inconel layer 44 is welded on a Cr42 steel substrate 42.

Figure 6:
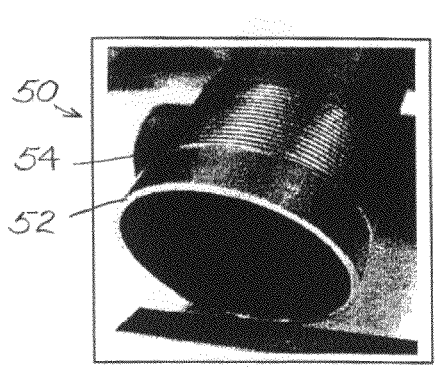
FIG. 6 is a photograph of aluminum Al-6061 tube, coated with titanium Ti-64 alloy produced with the present invention in a solid-state welding mode.

FIG. 6 shows a structure 50 formed by a titanium layer 54 welded to an aluminum tube substrate 52.

I claim:

1. A process and apparatus for energy beam assisted solid-state metallurgical bonding of a wire, having two or more flat surfaces, to a substrate, for the purpose of substrate coating, 3-Dimensional component buildup, restoration and component surface improvement, and comprising the steps of:
    applying of a continuously fed wire to a substrate such that the bottom of the wire flat surfaces are tangential to the substrate such that the contact of the wire with the substrate constitute substantially a surface;
    an energy beam is simultaneously applied to the wire, with a magnitude controlled to be sufficient to produce a sudden compressive shock wave and heat at the surface of the wire to propagate through the wire and the top surface of the substrate;
    whilst some material particles of the wire are carried with the shock wave and are penetrating into the substrate, producing a strong metallurgical bond without substantial liquefaction of the substrate.

2. The process and apparatus of claim 1 further including a means of controlling energy beam and its energy and power densities to achieve various magnitudes of the compressive shock wave at the top surface of the wire.

3. The process and apparatus of claim 1 further including a means of controlling energy beam and its energy and power densities and pulse duration to achieve various temperature gradients through the wire material and the top layer of the substrate material to produce the desired amount of penetration of wire material into the substrate material.

4. The process and apparatus of claim 1, further including a means of controlling energy beam's power and energy densities and pulse time duration to achieve the required temperature gradient through the wire, wherein while the part of the top surface of the fiat wire is liquefied, the surface of the wire adjacent to the substrate can be maintained in a solid or semisolid state at the temperatures below the liquefaction temperature of the substrate material.

5. The process and apparatus of claim 1 further including a wire delivery means to continuously delivering the wire onto the substrate such that the contact of the wire with the substrate constitute substantially a surface to provide a good coupling of wire and substrate for an effective transportation of thermal-wave and the shock-wave carrying the wire particles into the substrate.

6. The process and apparatus of claim 1 further including a means for adjusting the energy beam size appropriate to the wire width or to the desired fraction of the wire width.

7. The process and apparatus of claim 1 further including a means for scanning energy beam across the wire width for the purposes of wire deposition and cutting.

8. The process and apparatus of claim 1 further including a means of delivery of inert gas into the area of energy beam impingement with the wire to prevent the bonding from being effected or contaminated by the surrounding atmosphere or the process can be conducted in a vacuum.

9. The process and apparatus of claim 1 further including a means for a flat or 3-Dimensional component manipulation in 3-Dimensional space pivoted about the point, which belongs to the normal to the component's surface at the meeting point of the energy beam and the wire with the component's surface.

10. The process and apparatus of claim 1 wherein the wire material can be of any metal material available in the desired wire form, and non metal material in the strip or tow form.

11. The process and apparatus of claim 1 wherein the substrate material can be of any metal material and non metal material.

12. The process and apparatus of claim 1 wherein plurality of combinations of similar or dissimilar materials of wire and substrate can be used.

13. A component produced, built-up or coated with a layer or layers of materials in accordance with the process and apparatus of claim 1.

* * * * *